US010737339B2

(12) United States Patent
Bird

(10) Patent No.: US 10,737,339 B2
(45) Date of Patent: Aug. 11, 2020

(54) CIRCULAR SAW BLADE

(71) Applicant: California Saw and Knife Works LLC, Winchester, OR (US)

(72) Inventor: Warren M Bird, Berkeley, CA (US)

(*) Notice: Subject to any disclaimer, the term of this patent is extended or adjusted under 35 U.S.C. 154(b) by 0 days.

(21) Appl. No.: 16/729,197

(22) Filed: Dec. 27, 2019

(65) Prior Publication Data

US 2020/0139463 A1 May 7, 2020

Related U.S. Application Data

(63) Continuation-in-part of application No. 16/114,186, filed on Aug. 27, 2018, now abandoned, which is a continuation-in-part of application No. 15/421,079, filed on Jan. 31, 2017, now abandoned, which is a continuation-in-part of application No. 13/907,662, filed on May 31, 2013, now abandoned.

(60) Provisional application No. 61/784,869, filed on Mar. 14, 2013.

(51) Int. Cl.
*B23D 61/02* (2006.01)

(52) U.S. Cl.
CPC ......... *B23D 61/025* (2013.01); *B23D 61/021* (2013.01)

(58) Field of Classification Search
CPC .... B23D 61/025; B23D 61/021; B23D 61/04; B23D 61/123; B23D 61/02; B23D 61/023; B23D 61/026; B23D 61/028; B23D 61/06; B23D 61/065
See application file for complete search history.

(56) References Cited

U.S. PATENT DOCUMENTS

| | | | | |
|---|---|---|---|---|
| 14,172 A * | 1/1856 | Tyler | ...................... | B23D 61/06 83/840 |
| 1,033,996 A * | 7/1912 | Douglas | ................ | B23D 61/04 83/854 |
| 1,861,218 A * | 5/1932 | Huther | ................ | B23D 61/025 83/835 |
| 3,938,417 A * | 2/1976 | Nedsten | ............... | B23D 47/005 83/835 |
| 4,135,421 A * | 1/1979 | Bertram | ............... | B23D 61/021 83/835 |
| 4,848,205 A * | 7/1989 | Suzuki | ................ | B23D 61/025 83/853 |
| 4,979,417 A * | 12/1990 | Bird | ..................... | B23D 47/005 83/835 |
| 5,564,324 A * | 10/1996 | Bird | ..................... | B23D 61/12 83/661 |

(Continued)

*Primary Examiner* — Jonathan G Riley
(74) *Attorney, Agent, or Firm* — Mark S. Hubert

(57) ABSTRACT

A novel approach to a commercial circular saw blade designed for efficient lumber cutting as well as extended saw blade life because of a reduction in friction and better heat dispersion. The saw plate has thicker body transitioning to a thinner rim at a point between the bottom of the gullet and the bottom of the tooth, generally occurring at the hook of the gullet. This design increases the lateral stiffness of the blade, improves accuracy, maximizes sawdust ejection, eliminates blade wandering, decreases the amount of the cut waste and allows for increased cutting speeds without decreasing the performance or longevity of the blade. This design goes against traditional, prior art saw blade design because of its interpretation of wood physics, blade friction and side clearance tolerances.

4 Claims, 7 Drawing Sheets

(56) References Cited

U.S. PATENT DOCUMENTS 5,848,564 A * 12/1998 Vaagen ................. B23D 61/04
83/853
2010/0126326 A1* 5/2010 Cloutier ................. B23D 61/04
83/835

* cited by examiner

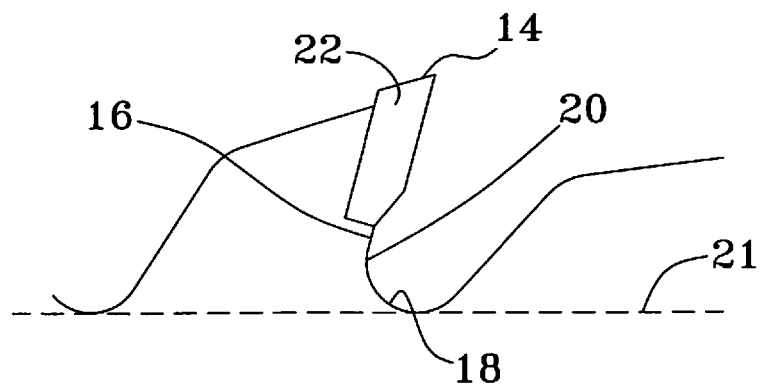
FIG. 2
Prior Art
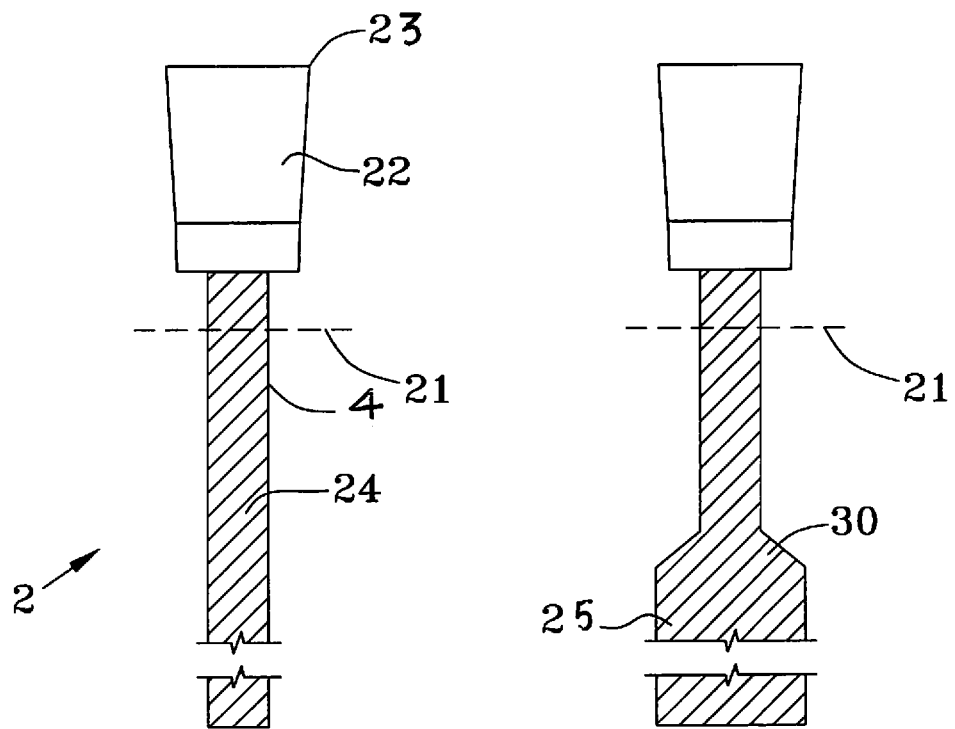
FIG. 3a
Prior Art
FIG. 3b
Prior Art

CIRCULAR SAW BLADE

PRIORITY

This utility patent application is a continuation-in-part of utility patent application Ser. No. 16/114,186 filed Aug. 27, 2018 and entitled "LATERALLY STIFFENED CIRCULAR SAW BLADE" which is a continuation-in-part of utility patent application Ser. No. 15/421,079 filed Jan. 31, 2017 and entitled "CIRCULAR SAW PLATE WITH THICKNESS DISCONTINUITY", which is a continuation-in-part of utility patent application Ser. No. 13/907,662 filed May 31, 2013 and entitled "CIRCULAR SAW PLATE WITH THICKNESS DISCONTINUITY", which claims priority to provisional patent application Ser. 61/784,869 filed Mar. 14, 2013 entitled "CIRCULAR SAW PLATE WITH THICKNESS DISCONTINUITY." This application incorporates by reference, in their entirety, all the above patent applications.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to commercial circular saw blades with an optimized design for efficient cutting and improved performance.

BACKGROUND

When commercially cutting trees and dimensional lumber at a lumber mill there are the following four major considerations: the amount of wood lost to the cutting process; the amount of sawdust waste generated; the accuracy of the cuts made; and the longevity of the saw blade.

Circular saw blade designs balance the kerf width with blade stability/rigidity (blade thickness) and blade longevity to arrive at an optimal saw blade profile and thickness. The species of wood being cut, the number of saw blade teeth, the moisture content, the wood temperature, the type of cut (rip or cross), the power and speed of the saws, the saw blade deflection, the saw blade diameter, are all factors that affect a saw blade's performance in a given mill environment.

Prevailing saw blade design favors uniform thickness saw blades wherein the saw blades have one thickness across the entire body of the plate, with that thickness being less than the actual kerf width and having sufficient side clearance on both sides of the saw blade. This ensures the actual kerf cut by the saw tooth tips is wider than the plate, avoiding unnecessary friction between the wood and the plate body as the blade rotates. There must be minimal contact between any part of the blade and the wood (with the exception of the saw tooth tips which are doing the actual cutting) to ensure minimal friction. Friction heats the blade causing loss of plate stiffness and distortion. It also causes the blade to deviate slightly in its travel (wander or snaking) leaving boards with uneven thicknesses. Conventional saw blade design has the entire saw blade body (plate) at the maximum thickness that can be tolerated-that is the width of the saw tooth tips minus an acceptable side clearance.

A blade capable of reducing friction with adequate side clearance, enhanced sawdust ejection capability to reduce sawdust friction, improved lateral stability to minimize wander or snaking, and reduced kerf to minimize wood loss and saw power requirements, fulfills a long felt need in the lumber mill industry.

BRIEF SUMMARY

In accordance with various embodiments, an improved design for a circular saw blade for accurate commercial lumber sawmill cutting with minimal saw blade wander and snaking is provided.

In one aspect, a commercial circular saw blade having increased lateral stability over the prior art, utilizing two saw plate thicknesses that interface in the gullet ring of the saw blade, preferably at the start of the hook initiation, is provided.

In another aspect, a commercial circular saw blade having less operational friction, capable of several sharpening cycles of its hardened tooth tips is provided.

In yet another aspect, a commercial circular saw blade that allows for minimal sawdust waste (maximum board recovery) is provided.

In yet another aspect, a commercial circular saw blade capable of dissipating a greater amount of frictional heat building into the blade without reducing the stiffness of the saw blade is provided.

In yet another aspect, a commercial circular saw blade is provided with a radial transition ring located between the bottom of the tooth tip and the bottom of the gullet, that bridges a thicker saw plate body to a thinner rim, and minimizes the stress cracking inherent in thickness transition regions of the blade body is provided.

Various modifications and additions can be made to the embodiments discussed without departing from the scope of the invention. In other words, while the embodiments described above refer to particular features, the scope of this invention also includes the ability to adapt to the particular goals of the user by prioritizing any combination of features without negatively impacting the others.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 2 is an enlarged side view of a tooth from the region A of the prior art uniform thickness saw blade of FIG. 1;

FIG. 3a is a cross sectional partial view of a prior art uniform thickness circular saw blade;

FIG. 3b is a cross sectional partial view of a prior art circular saw blade with a tapered thickness change occurring far from the rim of the saw blade;

DETAILED DESCRIPTION

Figure 1:
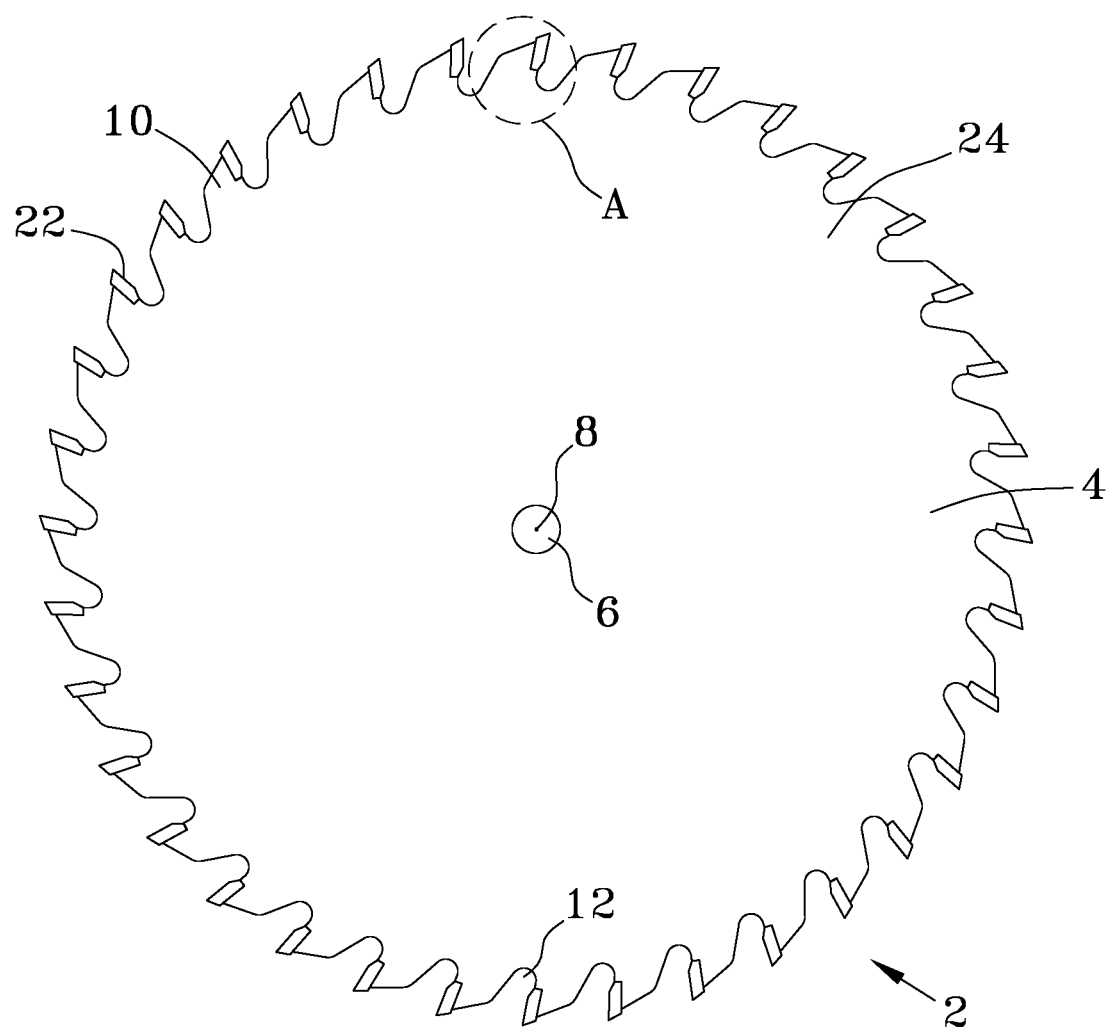
FIG. 1 is a side view of a side face of a conventional, prior art uniform thickness circular saw plate with tooth tips affixed so as to form a saw blade.
Figure 3C:
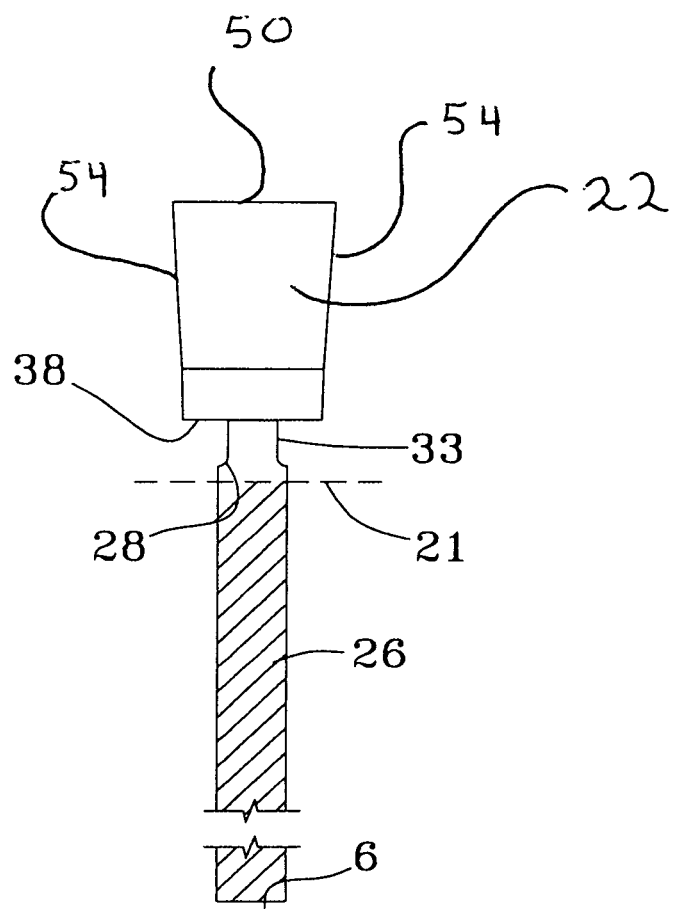
FIG. 3c is a cross sectional partial view of the present improved circular saw blade.
Figure 4A:
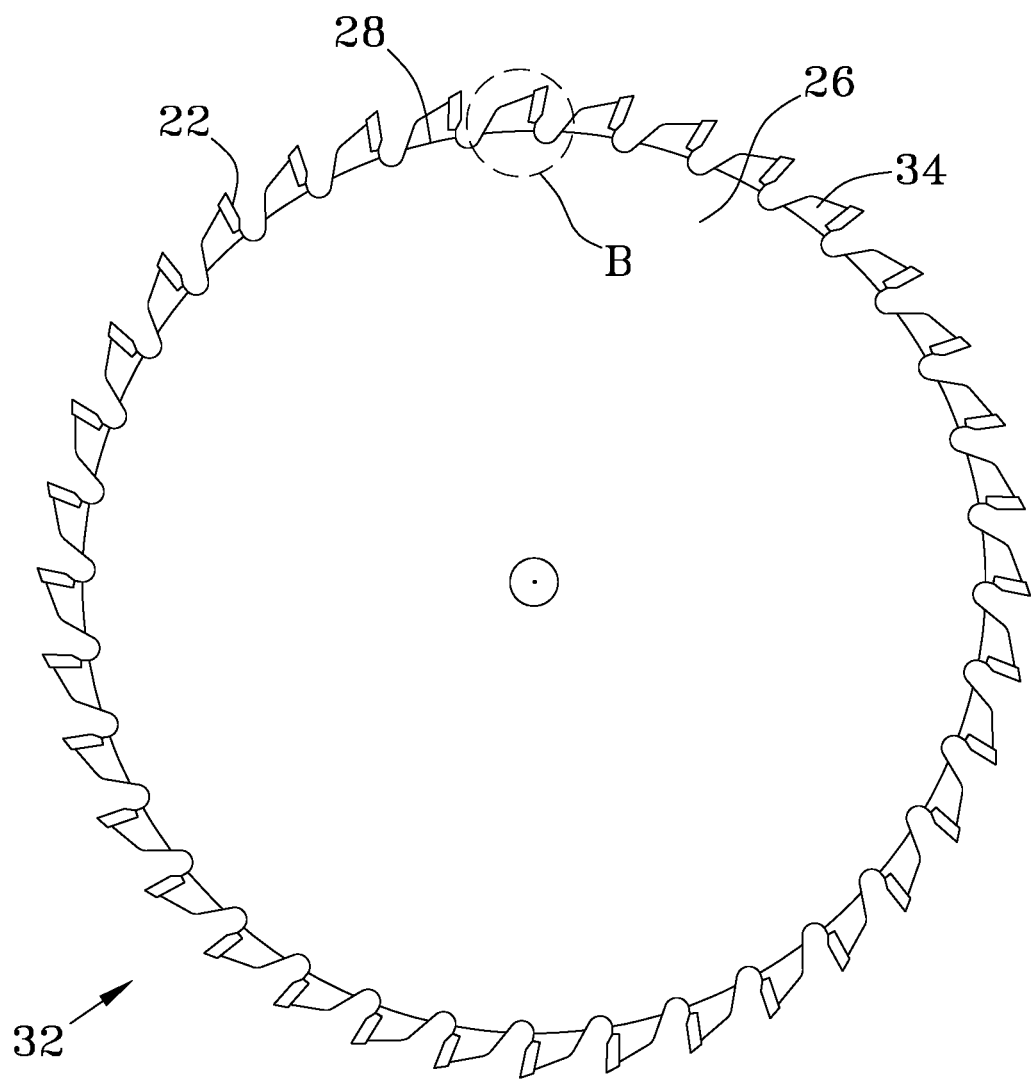
FIG. 4a is a side view of an improved thin rim circular saw blade (with tips)
Figure 4B:
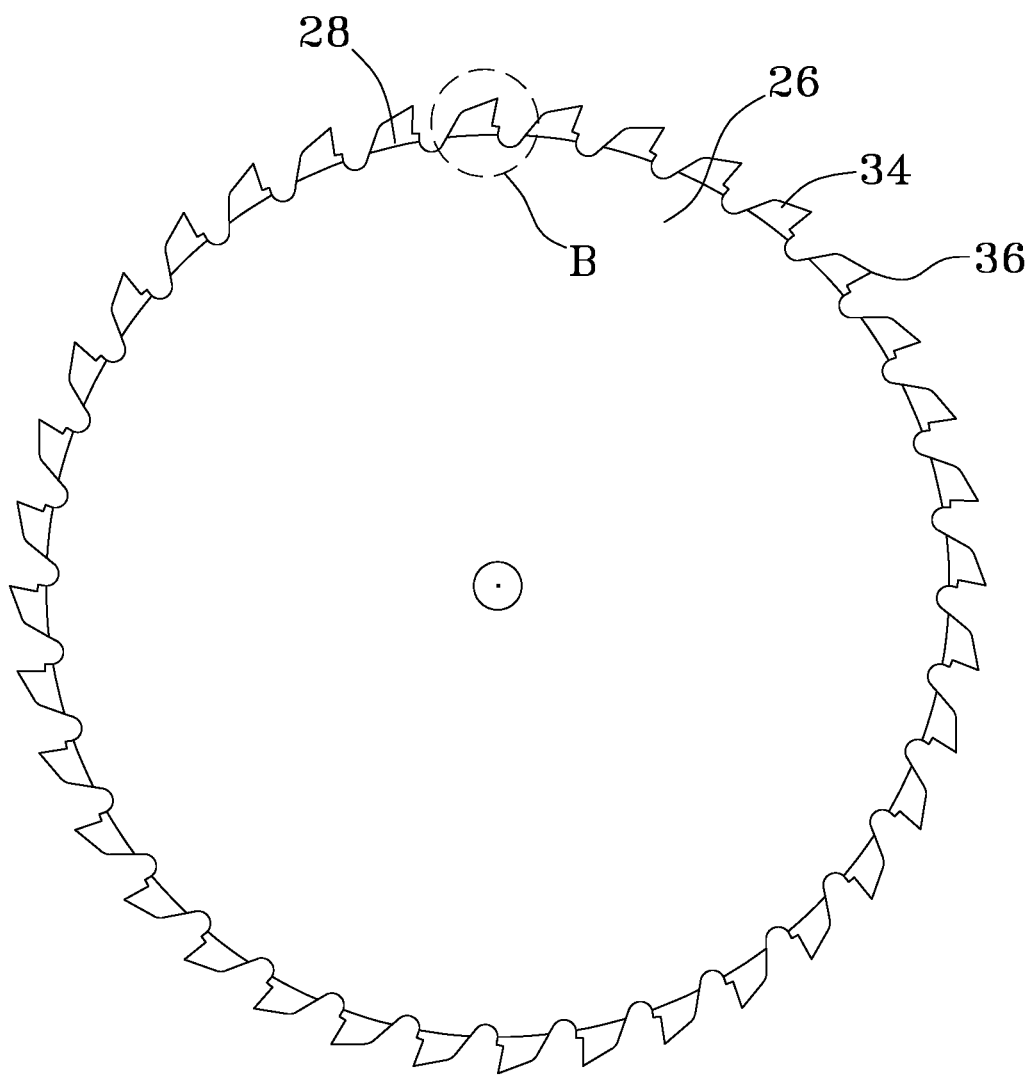
FIG. 4b is a side view of an improved thin rim circular saw plate (without tips)
Figure 5:
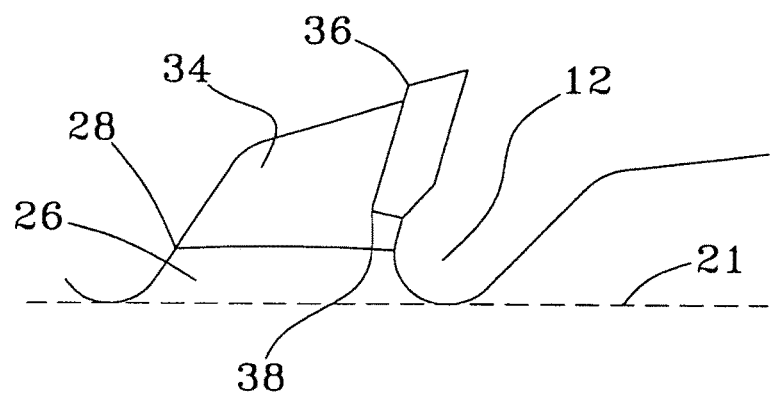
FIG. 5 is an enlarged side view of a tooth of the improved circular saw blade.

While various aspects and features of certain embodiments have been summarized above, the following detailed description illustrates in further detail, how one skilled in the art might practice such an embodiment. The described example is provided for illustrative purposes and is not intended to limit the scope of the invention.

In the following description, for the purposes of explanation, numerous details are set forth in order to provide a thorough understanding of the described embodiment. It will be apparent to one skilled in the art, however, that other embodiments of the present invention may be practiced without some of these specific details.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Up and top refer towards the outermost edge of the saw blade—that point furthest from the midpoint of the saw blade. Down and bottom refer towards the point closest to the midpoint of the saw blade.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "saw plate" refers to a circular disk with two planar parallel side faces, a ring of radially spaced teeth formed around its outer periphery, a gullet ring formed as a series of gullets formed on the leading edge of the teeth. (The leading edge of the teeth is the face between and perpendicular to the planar parallel faces of the saw blade and is the surface that faces in the intended direction of rotation of the saw blade.) A saw plate is a saw blade without saw tooth tips.

As used herein, the term "saw blade" refers to a saw plate with a ring of tooth tips affixed onto the teeth formed on the outer peripheral edge of the saw plate. While "saw blade" and "saw plate" have different definitions, it is common in the industry to use both terms when referring to a saw, as the plate is the main component of the blade, and most saw design concerns are surrounding the plate.

As used herein, the term "tooth tips" refers to pieces of hardened steel alloys or metal with any of a plethora of geometrical designs, having sharpened, generally beveled or hollow ground edges and/or sides, to allow their exit from the wood with as little friction as possible.

As used herein, the term "kerf width" refers to the cross-sectional width of the tooth tips of the saw blade. (The saw blade may use all identical tooth tips, alternating left and right tooth tips or a combination of either of these types with a different (clearing) tooth tip adjacent to any other tooth tip. The actual kerf width is measured at the tooth tips. It is equivalent to the width of a tooth tip and consequently the width of the cut on the top face of the board.

As used herein the term "side clearance" refers to the space between the widest part of the tooth tips and the planar side faces of the thin rim or the planar side faces of the plate body.

As used herein, the term "wood fiber spring back" is a phenomenon where the amount of space between the wood and the saw plate is reduced immediately after being cut due to the release of the residual internal stresses in the board. Prior to cutting, the fibers of wood in a board are under a tremendous amount of compression. As the cut is made the internal compression is relaxed and the wood fibers expand to decrease/narrow the gap between the wood and the saw.

As used herein, the term "gullet" refers to the C shaped cutout between the tooth tips of each adjacent tooth. The gullet has a linear portion beginning at the apex of the tooth that is used to affix the tooth tips on, and a C shaped curved hook portion that meets the linear portion at what is known as the hook initiation point. Gullets generally are sized for the collection of sawdust considering the depth of the cut, the number of teeth and the width of the kerf.

As used herein, the term "thin rim section of the circular disc" or "thin rim" refers to the thinnest cross-sectional part (ring) of the saw plate. The outer edge of the thin rim begins at the apexes of the teeth and the inner edge of the thin rim ends at the outer edge of the transition ring.

As used herein, the terms "thin rim saw blade" and "thin rim saw plate" are standard terms used for a saw blade with a rim that is thinner than the body of the saw blade. (A thin rim saw blade/plate refers to a saw blade/plate with a change in thickness between the periphery of the saw plate and the body of the saw plate.) The saw plate of the present invention has a thin rim section of the circular disc beginning at the teeth, a thicker, inner saw plate body section of the circular disc and a transition ring section of the circular disc at the circular interface between the outer thin rim section of the circular disc and the inner saw plate body section of the circular disc. The thin rim section of the circular disc, transition ring section of the circular disc and saw plate body section of the circular disc are concentric circles. In the preferred embodiment the saw plate is non-uniform in cross-section, having two thicknesses, and a transition zone therebetween occurring in a zone between the bottom of the tooth tips and the bottom of the gullet ring.

As used herein, the term "saw plate body section of the circular disc" or "saw plate body" refers to the innermost part of the saw plate, beginning at the inner edge of the circular transition zone and extending to the center of the saw plate. It has the thickest cross-sectional dimension of the saw plate, but is always thinner in cross-section than the tooth tips by the amount of its side clearance.

As used herein, the term "transition ring section of the circular disc" or transition ring" refers to the circular section of material between the thin rim section of the circular disc and the saw plate body section of the circular disc. This transitions the saw plate in its thickness from the thickness of the thin rim section of the circular disc to the thickness of the plate body section of the circular disc and is radiused throughout this change in thickness to minimize stress cracking and improve heat transfer to the thicker body.

The present invention offers a novel design for a circular saw blade for use in sawmills sawing logs and log segments into dimensional lumber. Its novelty stems from the fact that its design goes against all prior, conventional thinking in saw blade (and saw plate) design.

Although thin rim blades have been developed earlier, the transition ring section of the circular disc between the thin rim section of the circular disc and the saw plate body section of the circular disc has never been positioned beyond the bottom of the gullet. This was never done because it was against prevailing thought at the time which was that the entire depth of the saw blade cutting into the wood had to have the same substantial side clearance.

In the way of background, when sawmills saw logs and log segments into dimensional lumber, there is an enormous throughput of lumber which highlights an efficiency concern: the wider the cutting path (kerf width) of the saw, the more waste generated in the form of sawdust. Any sawdust created represents log material that did not produce lumber. Over time this creates a massive revenue gap.

Conversely, a narrow cutting path can only be generated with a thin plated saw, which comes with its own problem: the thinner the saw plate, the lower its relative stiffness. A thinner saw plate is susceptible to giving way to the lateral forces present in a typical lumber cutting environment. Lateral deflection of the saw blade under load is critical and must be held as small as possible. Deflection of the saw blade not only decreases the longevity of the saw, but it also leads to deviations (blade wander or snaking) in the path of the saw cut affecting the uniformity of the target board size, therein reducing the value of the lumber.

Each commercial mill has chosen a set of performance criteria based on how they believe they can maximize their revenue potential. Some mills may choose to produce lumber of the highest grade in order to get the highest revenue per board. Others may focus on producing the greatest volume of lumber out of each log so as to reduce the amount of waste generated in the form of sawdust. Still others may not care about the quality or efficiency of the lumber, but do care about total volume and how fast a log moves through the mill. Each goal requires a particular focus when it comes to saw blade design. The present invention allows for optimization of the mill's performance criteria without the side effects exhibited in prior designs.

Looking at FIGS. 1, 2, 3*a*, 6 and 8, the structure of a prior art uniform thickness saw blade can best be explained. A saw blade 2 is a steel planar disk (saw plate) with two parallel planar side faces 4 and an orifice 6 centered about the saw plate's midpoint 8. On the outer perimeter of the saw blade is formed a ring of teeth 10 having a gullet 12 formed between each adjacent tooth 10, on their leading edges. The gullet 12 is a C shaped cutout with a linear section 16 beginning on the tooth 10 at the bottom of the tooth tip 22, and a curved section 18 that begins at the bottom of the linear section 16 at a point called the hook initiation point 20. Dashed line 21 represents a section of the outline of a circle established at the gullet bottoms 11. Affixed to the front face of the teeth 10 are tooth tips 22. Generally, these tooth tips 22 are sharpened blocks of a stellite steel alloy or of sintered tungsten carbide. The saw blade 2 without the tooth tips 22 affixed to the teeth 10 is called a saw plate 24. The top edge 14 of the tooth tip 22 is the outermost extent of the saw blade 2.

FIG. 3*a* depicts the cross-section of the prior art uniform thickness saw blade of FIG. 1 from the top edge 14 of the tooth tips 22 to the edge of the orifice 6. Most saw blades 2 have a uniform thickness saw plate 24. This uniform thickness is less than the thickness of the tooth tips 22 by the summation of the two, identical side clearances between the widest part of the sides 23 of the tooth tips 22 and the two, planar side faces 4 of the saw plate 24.

The best practices for sawing with blades that were losing accuracy for a given wood and cut depth was to add blade stabilizers to the sides of the saw plate. These were either tapered or flat steel discs that were mounted on both sides of the saw plate and extended outward to a point less than the depth of the cut. This outward limitation (the diameter of the blade stabilizers) was because the thickness of these plates exceeded the side clearance dimensions of that saw tooth tip and saw plate and would physically abut the cut edge of the work piece and thus limit the depth of cut. In order to add the maximum stiffness to blades and prevent flexion along the saw blade's diameter, it was thought that making the inner ring of the saw plate much thicker than the kerf width would drastically increase the stiffness of the saw blade and would solve the problem, because in a static situation, the lateral deflection of the saw plate is a function of the cube of the cross-sectional thickness of the saw plate. Earlier iterations of thin blades attempted to eliminate the need for blade stabilizers as the blade itself would just be stiffer. This met with limited success and accuracy was increased, however the depth of cut was limited by the diameter of the inner ring of the saw blade.

FIG. 3*b* depicts an attempt in the prior art at adding lateral stability to a saw blade by increasing the thickness of the saw plate body 25 in a region far beyond the depth that the saw blade cuts into the wood. This design has a transition ring 30 where the saw plate thickens into the saw plate body 25. The transition ring 30 is far from the bottom of the gullet 21 as previous belief was that the thicker body could not approach the cut or else side clearance would be sacrificed.

Conventional blade design wisdom sought to maintain a consistent side clearance dimension between the teeth and the entire blade body in a uniform thickness saw blade. Thus, using a thicker saw blade body while stiffening the blade necessitated a wider set of tooth tips. This resulted in a wider kerf, more wasted wood, more friction, more heat buildup in the saw blade, and more sawdust to eject. Clearly, this is not an optimal solution. Modified designs have tried to stiffen the saw blade, capitalizing on the fact that the saw plate could be thickened beyond the depth the saw blade cut into the wood. Unfortunately, this added little lateral stability where it was needed most—at the cut.

The present invention utilizes a thin rim having the cross-sectional thickness approximating conventional uniform thickness blades with the appropriate side clearance for the intended purpose, but then transitioning before the bottom of the gullet ring into a saw plate body with a cross-sectional thickness greater than that of the thin rim.

Looking at FIGS. 3*c*, 4*a*, 4*b*, 5 and 7, the design of the improved thin rim circular saw blade 32 can best be explained. The thin rim section of the circular disc 34 of the saw plate extends from the tip of the teeth 36 (FIGS. 4*b* and 8) to a location between the bottom 38 of the tooth tips 22 and the bottom 21 of the gullet 12. At the bottom of the thin rim 34 is a radiused transition zone 28 where the saw plate thickens into the saw plate body 26. As can be seen the circular transition ring section of the circular disc 28 is far above the bottom 21 of the gullet 12 (further from the center of the saw blade). The transition ring section of the circular disc will always be located between the bottom of the tooth tip 38 and the bottom of the gullet. It is to be noted that the tooth tips 22 are hardened steel alloy blocks, that have a top face 50 with top face edges 14, a bottom face 38 with bottom face edges 52 and planar side faces 54 extending the entire distance between the top edges 14 and bottom edges 52 of the tooth tip. As seen best in FIG. 7, these planar side faces are not parallel.

This invention is centered around the phenomenon of wood fiber spring back. Before a log is cut, the wood fibers within the log are experiencing a varying amount of compression. As the cutting action takes place, this compression is released and the wood fibers are able to expand. The expansion provides an additional source of friction, most notably in the area of the cut. The further the material moves past the saw's tooth tips 22, the more the separated pieces are able to move independent of each other. To allow for the expansion, and minimize the friction it may cause, there must be a sufficient amount of side clearance between the saw kerf and the thickness of the saw plate at the rim.

Figure 6:
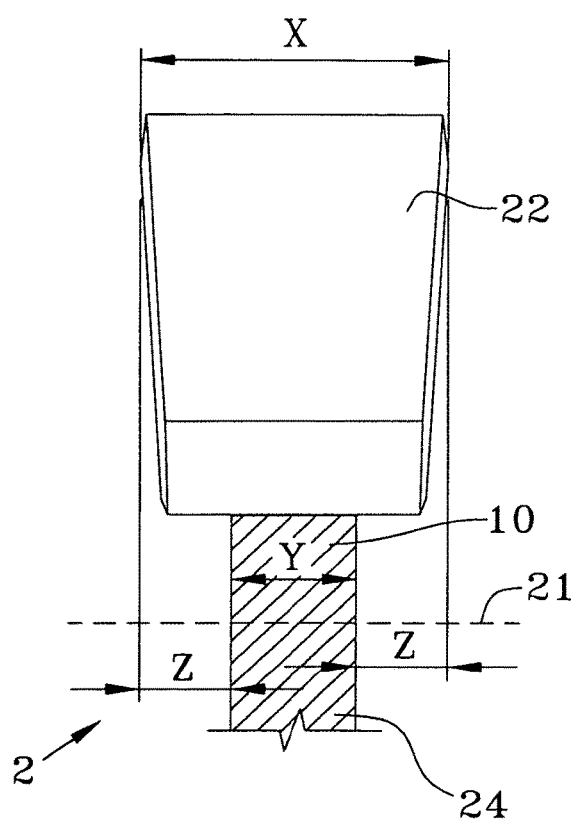
FIG. 6 is an enlarged cross-sectional partial view of a prior art uniform thickness circular saw blade showing related dimensions.

The prevailing belief has been that side clearance (twice the dimension indicated by arrows Z in FIG. 6 and FIG. 7) must be established with relation to the thickest part of the plate making its way through the cut in the wood. FIG. 6 shows a uniform thickness circular saw blade 2. Here the side clearance established is the difference in the thickness between the widest part X of the tooth tips 22 (kerf width) and the thickness Y of the saw plate 24.

Figure 7:
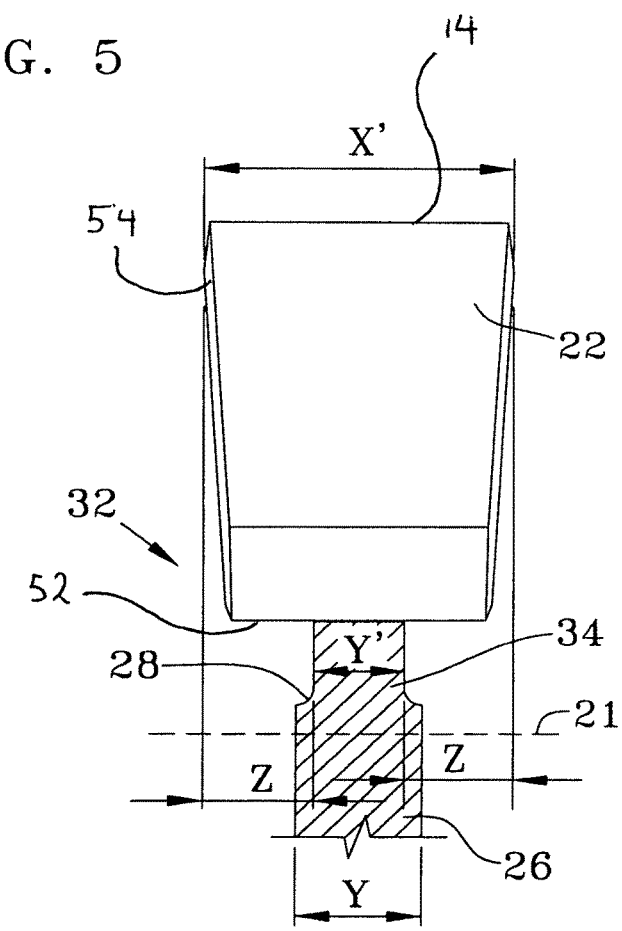
FIG. 7 is an enlarged cross-sectional partial view of the improved circular saw blade showing related dimensions.
Figure 8:
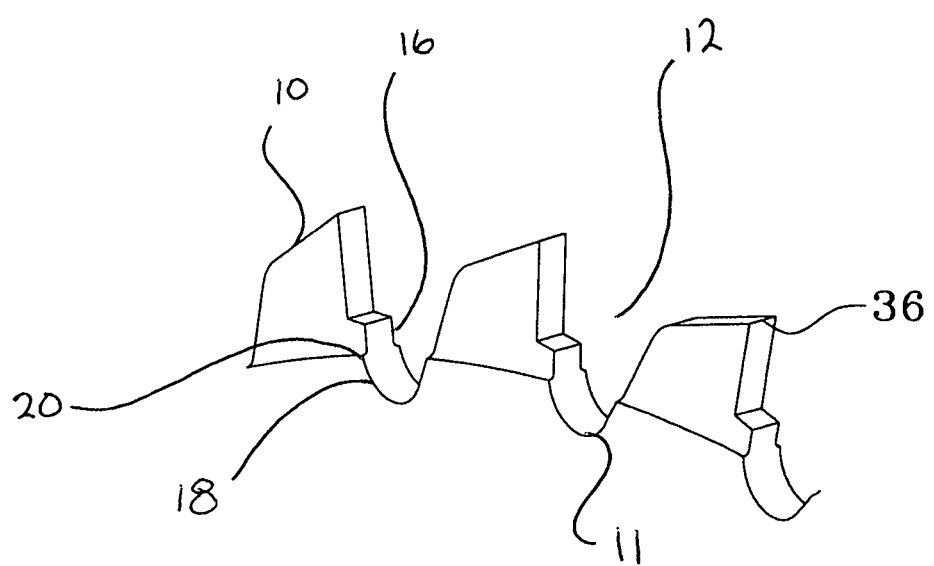
FIG. 8 is a perspective view of three teeth of the improved saw plate.

Looking at FIG. 7, it can be seen that the improved thin rim circular saw blade 32 has a side clearance of twice the thickness of Z, established at the thin rim 34 as the difference in the thickness between the widest part X' of the tooth tips 22 (kerf width) and the thickness Y' of the thin rim 34. This side clearance, as in the uniform thickness saw blade, is set based on the requirements of the saw blade application. Since the amount of clearance narrows briefly as the tooth tips 22 cut into the wood, due to wood fiber expansion, the side clearance Z is necessitated and measured at the point immediately after the saw tooth tips 22, which in the present design is at the thin rim 34.

The natural solution to minimizing the saw load and reducing material waste is to use a thinner saw plate, which allows the kerf to be proportionally decreased. However, in utilizing a thinner saw plate, the thickness of the saw plate approaches the point where it does not offer enough lateral support (stiffness) to prevent the deflection of the saw blade. This is the most critical feature of a commercial saw blade—its ability to cut accurately and cut straight. Similarly, the solution to inaccurate cutting is the reverse: the saw plate must be made stiffer, which can only be accomplished with stiffer steels and thicker saw plates. Since the steel selection has long been optimized for this scenario, this leaves only maximizing the saw plate thickness within operable parameters for the given kerf. The present design introduces a thicker saw plate body, making the saw plate stiffer and better suited to withstand lateral forces, with a thinner saw plate at the rim, allowing for a reduced saw kerf, minimizing material waste.

It is already known within the industry that a thicker saw plate increases a saw's ability to withstand lateral forces, but previous designs did not significantly alter stiffness toward the periphery of the saw where these forces are most present. The present design extends the thicker body radially beyond the gullets, and has proven through experimentation to be significantly stiffer than previous designs. In trials of the present design, measured accuracy of its cuts increased by about ⅓, proving that the blade better withstood the impact of lateral forces. Although a portion of this accuracy improvement can be attributed to other innovations of the present design, much of it is due to the increase to the blade's stiffness.

A saw's ability to cut straight (which is predominately determined by its stiffness) is important for several reasons. If the blade is providing accurate cuts, the lumber it is producing will also be accurate. Since the revenue a given board generates is determined by the precision of its measurements, a stiffer saw can lead to an increase in revenue. Furthermore, a saw that is not cutting straight is by default wandering/snaking side to side. This means the blade is likely rubbing against both faces of the material, creating friction. Friction leads to heat, and heat leads to distortion, which in some cases a saw cannot recover from. When either of these occurrences is observed by an operator, it leads to a third reason a saw must cut straight: it gets replaced when it isn't performing. Each lumber mill has a predetermined amount of time that it expects its saws to be able to run without needing to be rotated out. This generally falls during a shift change or some other form of break. Any saw change deemed necessary outside of these planned saw changes creates preventable machine downtime. Any saw change, planned or unplanned, costs a lumber mill a measured amount of dollars in time and lost revenue. Furthermore, any saw that is taken out of rotation must then be repaired, re-sharpened, or replaced. It then goes without saying that saw changes must be minimized for a lumber mill to remain profitable. All of this points to the importance of the improvements the present design has made to the stiffness of the saw plate, and the consequential boost to its lifespan.

The thinner rim of the present design is incrementally innovative when it comes to how sawdust interacts with the blade. It is known that circular saw designs must incorporate gullets, separating the saw teeth, as they are designed to carry the sawdust away from the cut. Sawdust carry is important because any sawdust that finds its way between the saw plate and the material being cut creates friction. This heats up the body of the saw, and depending on the amount of friction created, will ultimately lead to its failure. Friction reduces the longevity of the blade. The more efficient the saw is at carrying away sawdust from the cut, the less opportunity there is for friction. As the gullets are the instruments for this process, the gullets are where this efficiency must be considered. In order to carry away more sawdust, the surface area of the gullets must be increased. This means the gullets must either be made deeper, wider, or the plate thickness at the gullet must increase. Any change in the gullet shape (depth or width), however, dramatically impacts how the saw interacts with the wood. There are well established formulas that perfect this part of the saw's design. Therefore, the only factor that can be modified is the thickness of the saw plate at the bottom of the gullet. In the present design, the surface area at the bottom of the gullets is increased in order to better the saw's ability to carry away sawdust.

This invention optimizes the kerf and lateral stability of the saw blade while reducing friction from cutting forces and sawdust spillage. Reducing friction results in less stress and less heat buildup in the saw blade, extending life and eliminating saw blade distortion. Saw power consumption and torque requirements are also reduced. In this design, should a mill choose to thicken the saw blade body while leaving the rim thickness the same as it would be for a conventional, uniform thickness saw blade, additional stiffness will be garnered, ensuring cutting path accuracy. Because the thickened saw body begins at the approximate radial midpoint of the gullet where the gullet hook begins, there is the added benefit of increasing the sawdust ejection ability of the saw blade due to the thicker gullet bottom with respect to the width of the teeth.

Utilizing this same design in a different manner, or by thinning the peripheral rim of the gullet ring without thickening the body (maintaining the conventional, uniform thickness saw blade's saw body thickness), the rim of the saw can be made narrower, which allows the kerf to also be reduced by a proportional amount. Should a mill choose to go this route, they would be generating less waste in the form of sawdust, producing a greater quantity of boards with the same number of logs, all without sacrificing the other aspects of the saw's performance such as its ability to cut straight and its overall longevity.

The present design also identifies that the thickness transition is to occur below the bottom of the saw tooth tips. As the saw tooth tips must be ground on each side to achieve the given kerf, the thickness transition must occur below the bottom of the saw tooth tips in order to grant space for the grinding equipment and grinding process. This defines the upper limit where the thicker saw plate body ends and the thin rim begins in the present design (with the lower limit previously defined as the bottom of the gullet).

Another consideration in saw design is that replacing the saw tooth tips is a time consuming and expensive operation. Therefore, each blade needs to have the ability to be re-sharpened in order to make it cost effective. Re-sharpening the saw tooth tips (by grinding the face and/or top surfaces), however, results in reduction of the saw kerf, and, hence, reduction of the amount of side clearance between the saw kerf and the saw plate. Thus, the initial difference between the saw plate thickness and the magnitude of the saw kerf must be great enough to accommodate several cycles of operation and re-sharpening before the saw tooth tip is removed and replaced by a tooth tip of the original dimensions. The operation of re-sharpened saws must still avoid any contact between the saw plate and the work piece material, despite the diminished kerf. There must always be sufficient side clearance between the kerf and the thickness of the saw plate at the rim. The present invention allows increased lateral stability which allows the saw blade to flex less when the tooth tips are sharpened. This increased accuracy and precision in saw tooth tip sharpening with less plate distortion from better heat dissipation and minimized blade wander/snaking from increased lateral stability, allows for smaller side clearances. This translates into thinner saw tooth tips for the same saw plate thickness, thereby reducing the kerf width and minimizing sawdust waste.

Additional cutting accuracy is contributed in the way that the present design allows the saw tooth tips to be sharpened. A circular saw blade is clamped in the region of the bottom of the gullets when the saw tooth tips are to be sharpened. In the present design, the thicker body extends beyond the bottom of the gullet, allowing the clamping action to extend closer to the area where the grinding is occurring while also adding additional saw plate thickness in the tooth ring region. This discourages deflection of the saw teeth as they are under side load from the grinding of the tooth tips, and allows for a better angular symmetry of the tooth tips when they are sharpened. As a result, the applicable angles (known as radial and tangential side clearance angles) are much more precise and uniform. The uniformity of these angles is an essential component of cutting straight and cutting accurately, as any deviation from perfect symmetry would result in the cutting forces laterally pulling the saw blade away from its intended path.

Beyond these factors, there is the consideration that frictional heat buildup in a saw blade starts at the saw tooth tips, at the outer periphery of the teeth, and spreads inward toward the center of the blade. In a uniform thickness saw blade, the periphery of the saw will still consistently experience the most heat, but there is no barrier keeping the heat from moving toward the center of the blade. In a saw with any change in thickness, the heat must navigate this thickness change in order to make it toward the center of the saw. In addition to the advancements noted above, until the current design, any attempts to mitigate the downfalls of a uniform thickness saw have been unable to address the issues of heat transfer, and the resultant distortion and stress cracking from these previous designs have shortened the lifespans of the saws.

In a saw with a thickness change, the narrower the width of the outer part of the saw, which has the reduced thickness, the less heat it can absorb before it expands and distorts with respect to the other, thicker part of the saw (which can absorb more heat before expanding). The concerns here are twofold: 1) the design must provide an opportunity for the heat to move from the thinner part of the saw to the thicker part or it will suffer from stress cracking, and 2) the design must be aimed at minimizing the moving parts resulting from independent distortion. The second concern is not addressed in previous designs, but is observably addressed in the present design as the thinner part of the saw is restricted to the very periphery of the blade, beyond the gullets. Therefore, the majority of the blade is a uniform thickness, alleviating the concern that a portion of the blade will distort independent of the rest of it, further decreasing the probability of an early failure (from stress cracking and/or excessive distortion).

The present design also solves the issue of heat transfer in a saw with multiple thicknesses. Heat is inevitable at the periphery of the saw where the cutting is being done. As the temperature of the saw is far lower toward the center, the heat must move in that direction. A thickness change creates an obstacle that the heat must navigate as it moves toward the middle. Previous designs experimenting with multiple thicknesses have been unable to address this issue, resulting in stress cracking at the areas where the transitions occur. In order to avoid stress cracking, the present design utilizes a radiused transition between the thin rim and the thicker body. This radial transition allows the heat to transfer toward the center of the saw without issue. Furthermore, testing has proven that the width of this radial transition can be relatively insignificant without impacting the blade's ability to transfer heat. These discoveries have allowed the transitional radius within the new design to begin and end much closer to the periphery of the saw, permitting the thicker body to span well beyond the bottom of the gullets.

The present design introduces a narrow cutting path relative to the thickness of the body, reducing material waste and increasing lumber recovery. The thicker saw plate body extends beyond the bottom of the gullets, increasing the blade's stiffness where it matters most, which has proven to significantly improve the saw's ability to produce accurate cuts and higher quality lumber. Its ability to remain cutting straight for long periods of time, undergo multiple re-sharpening cycles, and process the transfer of heat without increasing its chances of distortion and/or stress cracking, has proven to decrease downtime resulting from unplanned saw changes, and increase the overall longevity of the saw. In accomplishing these successes, the present design has become the first saw able to positively address each of the four major saw design considerations without compromising the others.

Having thus described the invention, what is claimed as new and desired to be secured by Letters Patent is as follows:

1. A circular saw blade comprising:
   a circular disk having two planar sides, a center and an outer peripheral edge;
   a ring of radially spaced teeth formed around said outer peripheral edge, each tooth of said ring of teeth having an apex and a leading edge each residing between and perpendicular to said planar sides;
   a ring of radially spaced gullets formed as a ring of cutouts between adjacent said teeth, each of said gullets having a linear portion with planar sides beginning at said apex, a curved hook portion that meets said linear portion at a hook initiation point, and a bottom;
   a planar thin rim section of the circular disc with a first cross-sectional thickness formed on said saw blade, said thin rim beginning at said outer peripheral edge and extending to a transition ring section of the circular disc;
   a saw plate body section of the circular disc with a second cross-sectional thickness formed on said saw blade, said saw plate body beginning at said transition ring section of the circular disc and extending inward toward said center;
   a set of tooth tips affixed to said leading edge of said teeth, wherein each tooth tip of said set of tooth tips has a top edge and a bottom edge and at least two planar side faces extending the entirety between said top face edge and said bottom face edge;
   and wherein said transition ring section of the circular disc connects said thin rim and said saw plate body section of the circular disc, with said thin rim section of the circular disc said transition ring section of the circular disc and said saw plate body section of the circular disc all concentric;
   wherein said second thickness is larger than said first thickness;
   said transition ring section of the circular disc increasing in cross sectional thickness from linear portion to saw blade plate body section of the circular disc;
   wherein an entirety of said transition ring section is located between said bottom edge of said tooth tip and said bottom of said gullet in a radial direction.

2. The circular saw blade of claim 1 wherein said transition ring section of the circular disc has a first edge abutting said thin rim section of the circular disc and a second edge abutting said saw plate body section of the circular disc and wherein there is a radius between said first edge and said second edge.

3. The circular saw blade of claim 1 wherein said transition ring section of the circular disc begins within ¼ of an inch distance from said hook initiation point.

4. A circular saw blade comprising:
   a saw plate made of a circular disk having two planar sides, a center and an outer peripheral edge;
   a ring of radially spaced teeth formed around said outer peripheral edge, each tooth of said ring of teeth having an apex and a leading edge each residing between and perpendicular to said planar sides;
   a ring of radially spaced gullets formed as a ring of cutouts between adjacent said teeth, each of said gullets having a linear portion with planar sides beginning at said apex, a curved hook portion that meets said linear portion at a hook initiation point, and a bottom;
   a set of tooth tips affixed to said leading edge of said teeth wherein each tooth tip of said set of tooth tips has a top edge and a bottom edge and at least two planar side faces extending the entirety between said top face edge and said bottom face edge;
   and wherein said gullet bottom has a first thickness that exceeds a second thickness of said linear portion; and a transition ring section, wherein an entirety of said transition ring section is located between said bottom edge of said tooth tip and said bottom of said gullet in a radial direction.

\* \* \* \* \*